Figures 11, 13:
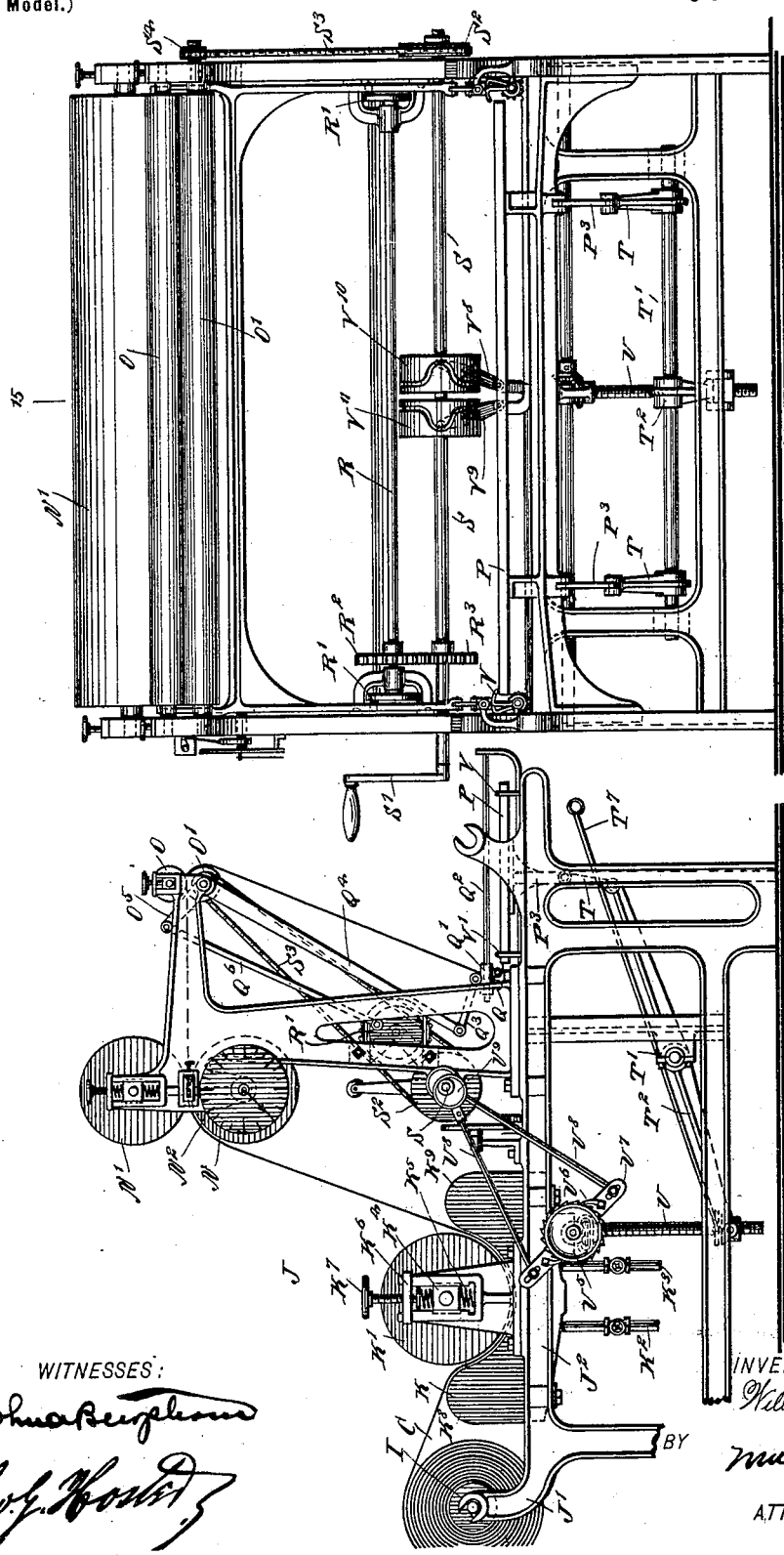

No. 676,462. Patented June 18, 1901.
W. HEBDON.
METHOD OF SHRINKING AND FINISHING LINENS, COTTONS, OR OTHER FABRICS.
(Application filed Apr. 26, 1899.)
(No Model.) 8 Sheets—Sheet 1.
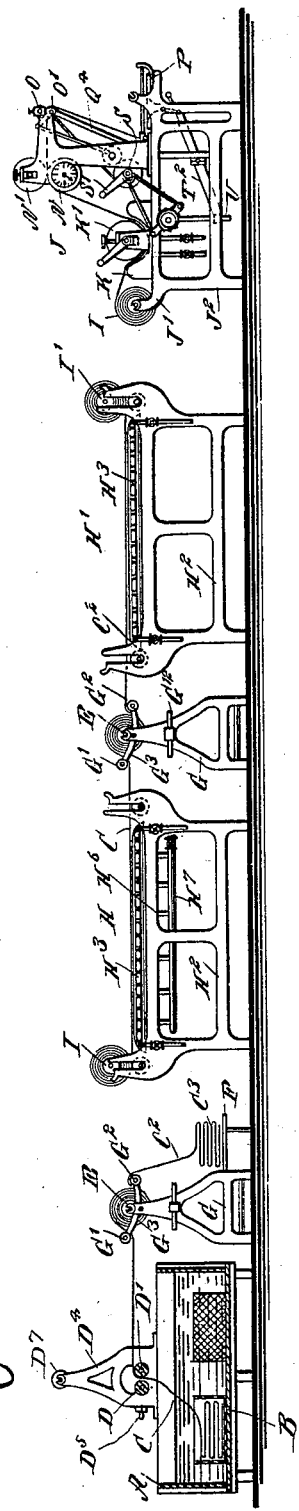
Fig.1
WITNESSES:
INVENTOR
William Hebdon.
BY 
ATTORNEYS.

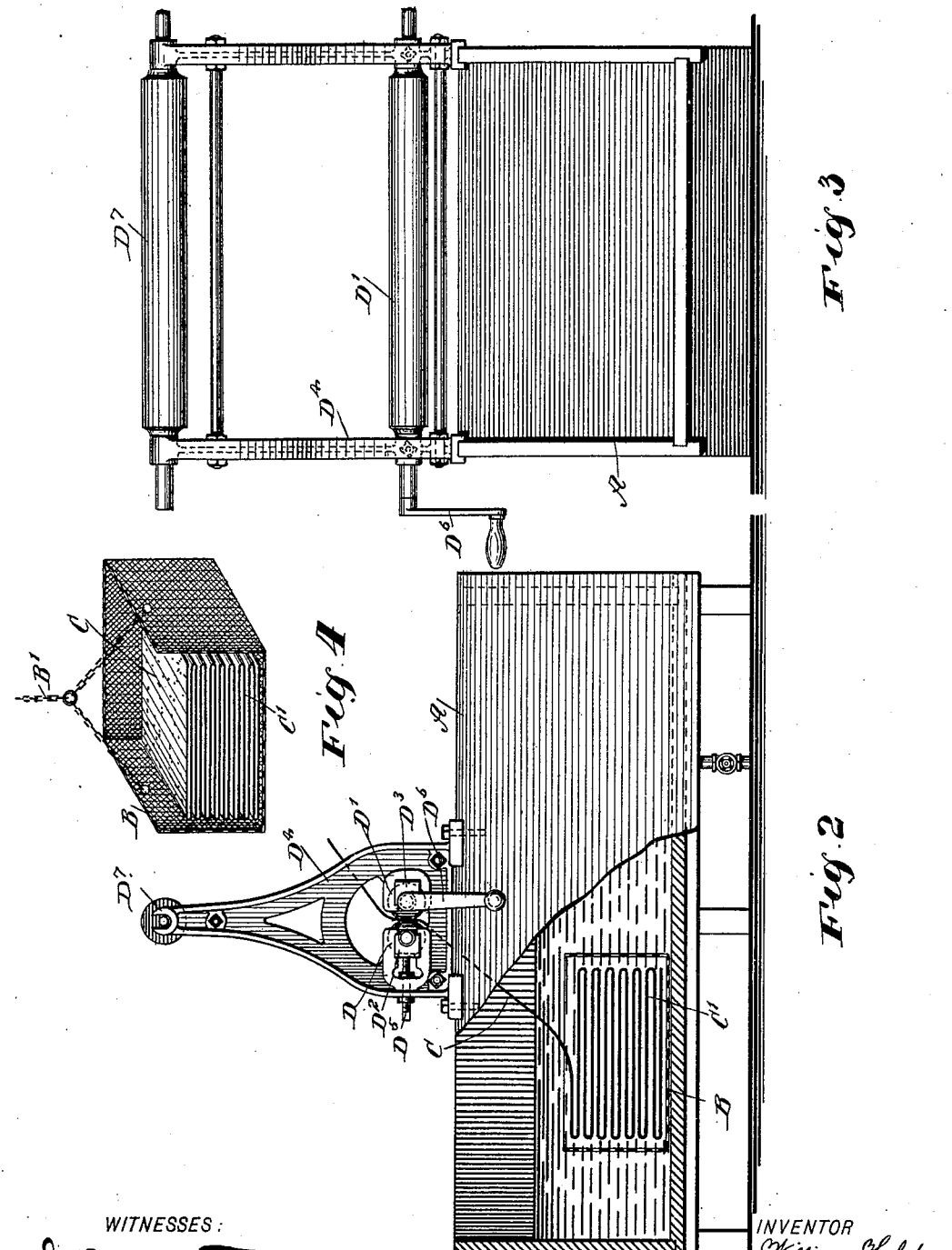

No. 676,462. Patented June 18, 1901.
W. HEBDON.
METHOD OF SHRINKING AND FINISHING LINENS, COTTONS, OR OTHER FABRICS.
(Application filed Apr. 26, 1899.)
(No Model.) 8 Sheets—Sheet 3.
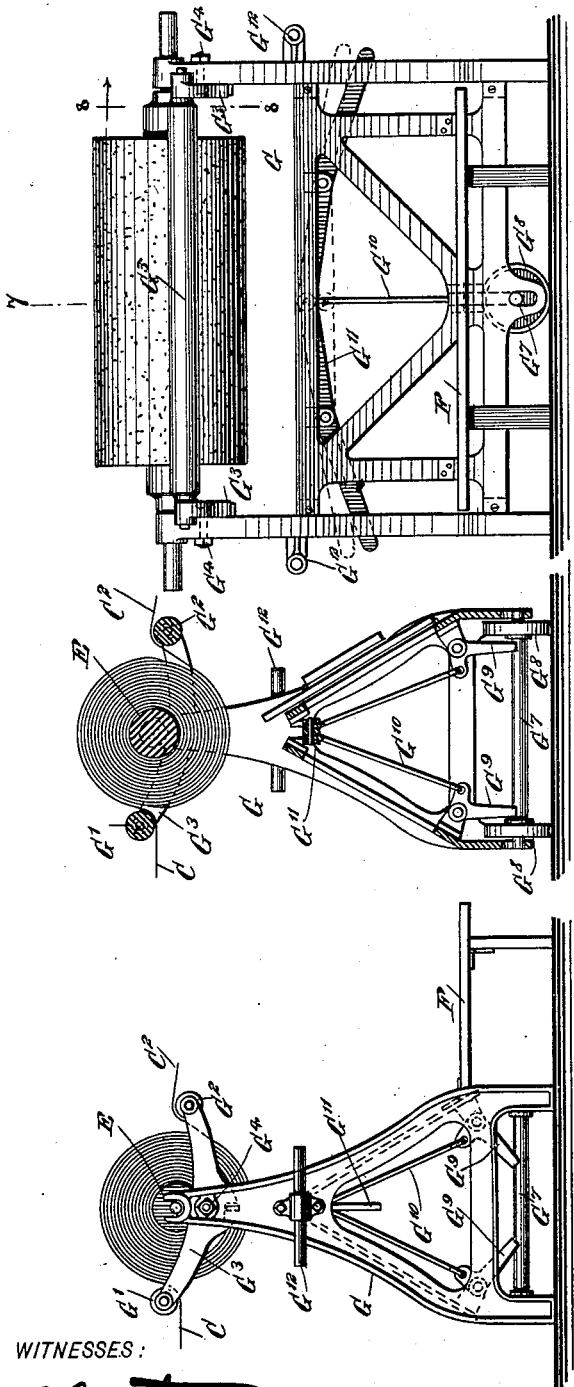
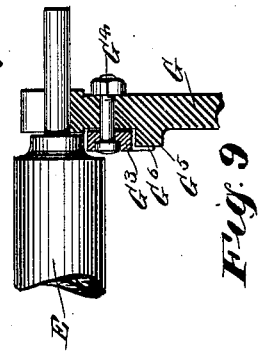
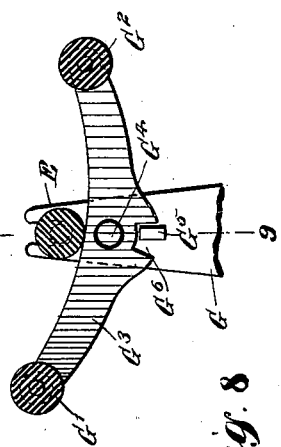

No. 676,462. Patented June 18, 1901.
W. HEBDON.
METHOD OF SHRINKING AND FINISHING LINENS, COTTONS, OR OTHER FABRICS.
(Application filed Apr. 26, 1899.)
(No Model.) 8 Sheets—Sheet 4.
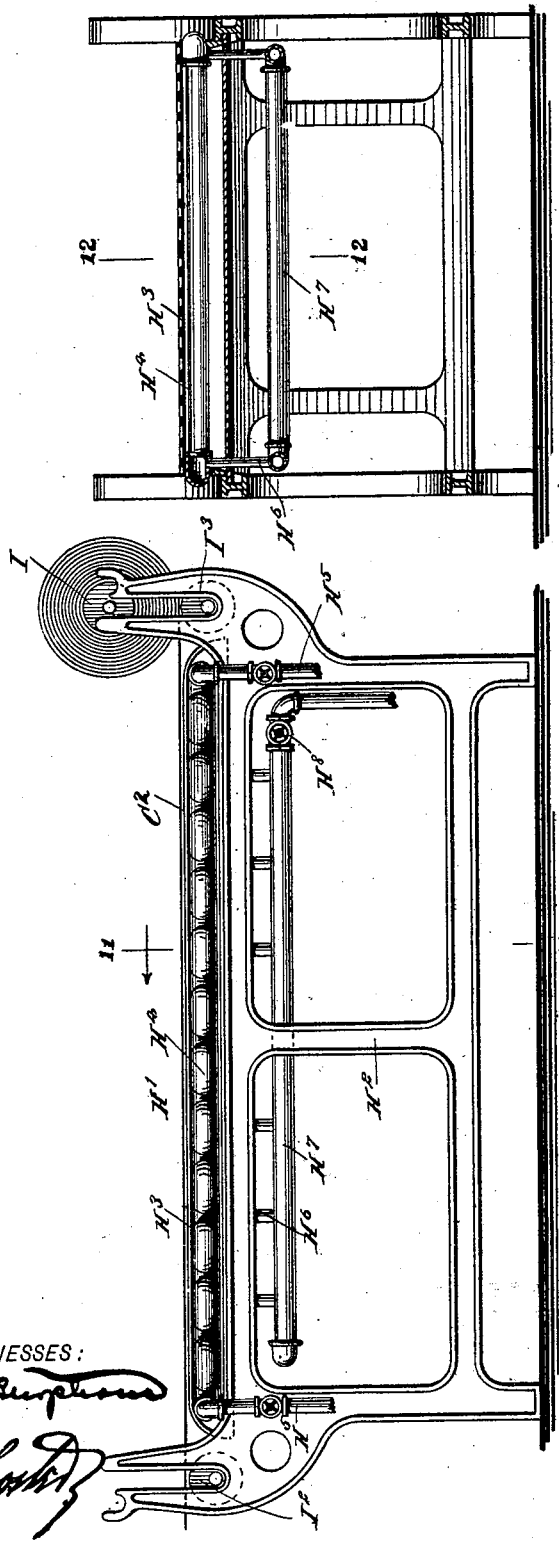
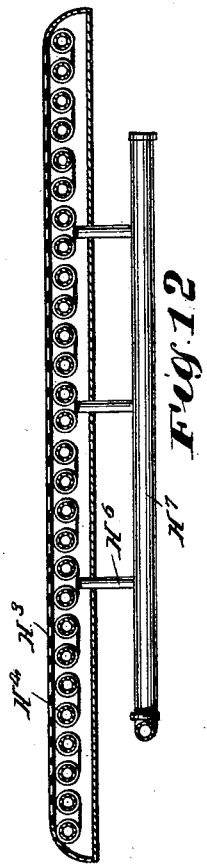
WITNESSES:
INVENTOR
William Hebdon.
BY
ATTORNEYS.

No. 676,462. Patented June 18, 1901.
W. HEBDON.
METHOD OF SHRINKING AND FINISHING LINENS, COTTONS, OR OTHER FABRICS.
(Application filed Apr. 26, 1899.)
(No Model.) 8 Sheets—Sheet 5.

WITNESSES:
INVENTOR
William Hebdon.
BY
ATTORNEYS.

No. 676,462. Patented June 18, 1901.
W. HEBDON.
METHOD OF SHRINKING AND FINISHING LINENS, COTTONS, OR OTHER FABRICS.
(Application filed Apr. 26, 1899.)
(No Model.) 8 Sheets—Sheet 6.

No. 676,462. Patented June 18, 1901.
W. HEBDON.
METHOD OF SHRINKING AND FINISHING LINENS, COTTONS, OR OTHER FABRICS.
(Application filed Apr. 26, 1899.)
(No Model.) 8 Sheets—Sheet 7.
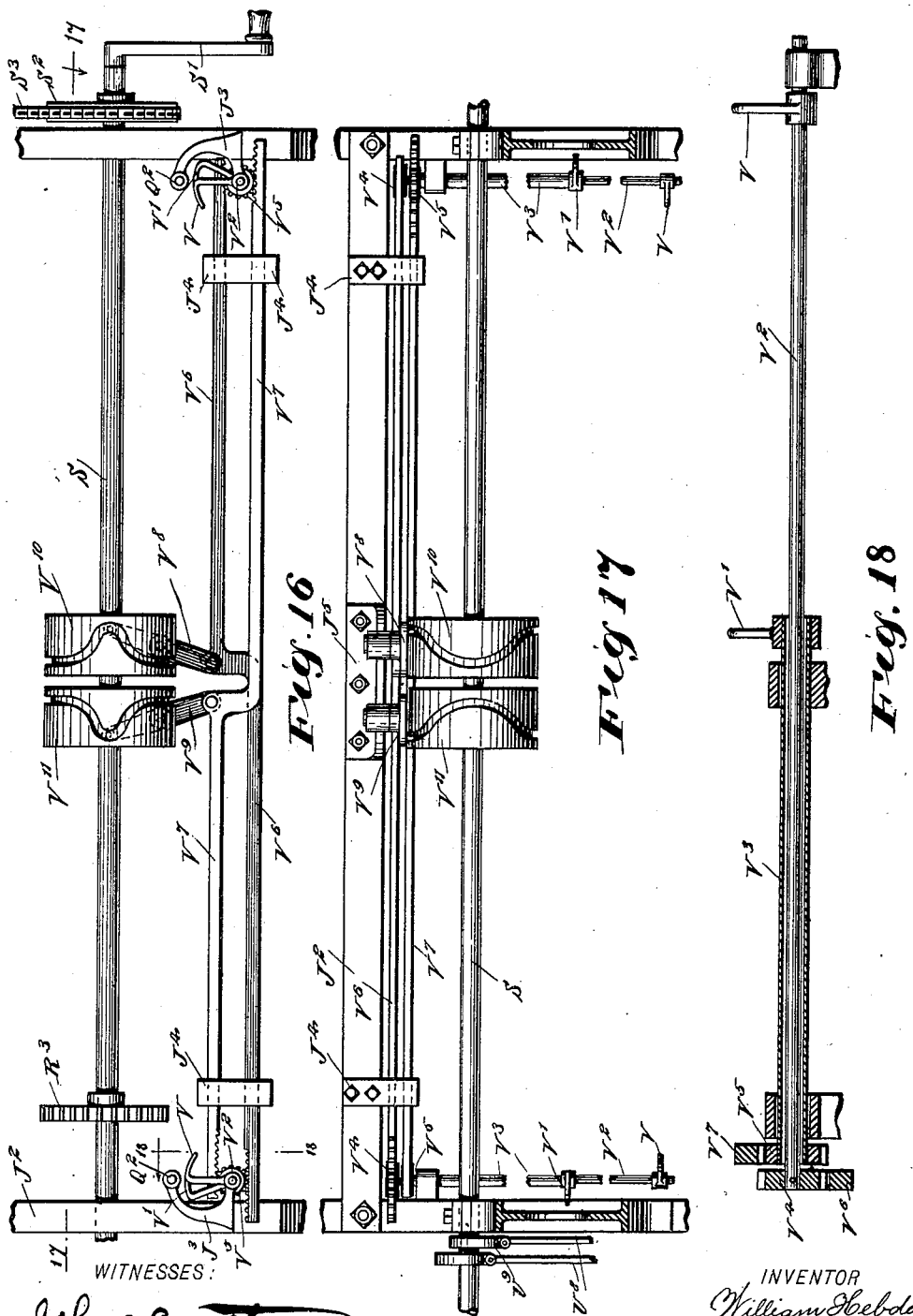
WITNESSES:
INVENTOR
William Hebdon
BY
ATTORNEYS.

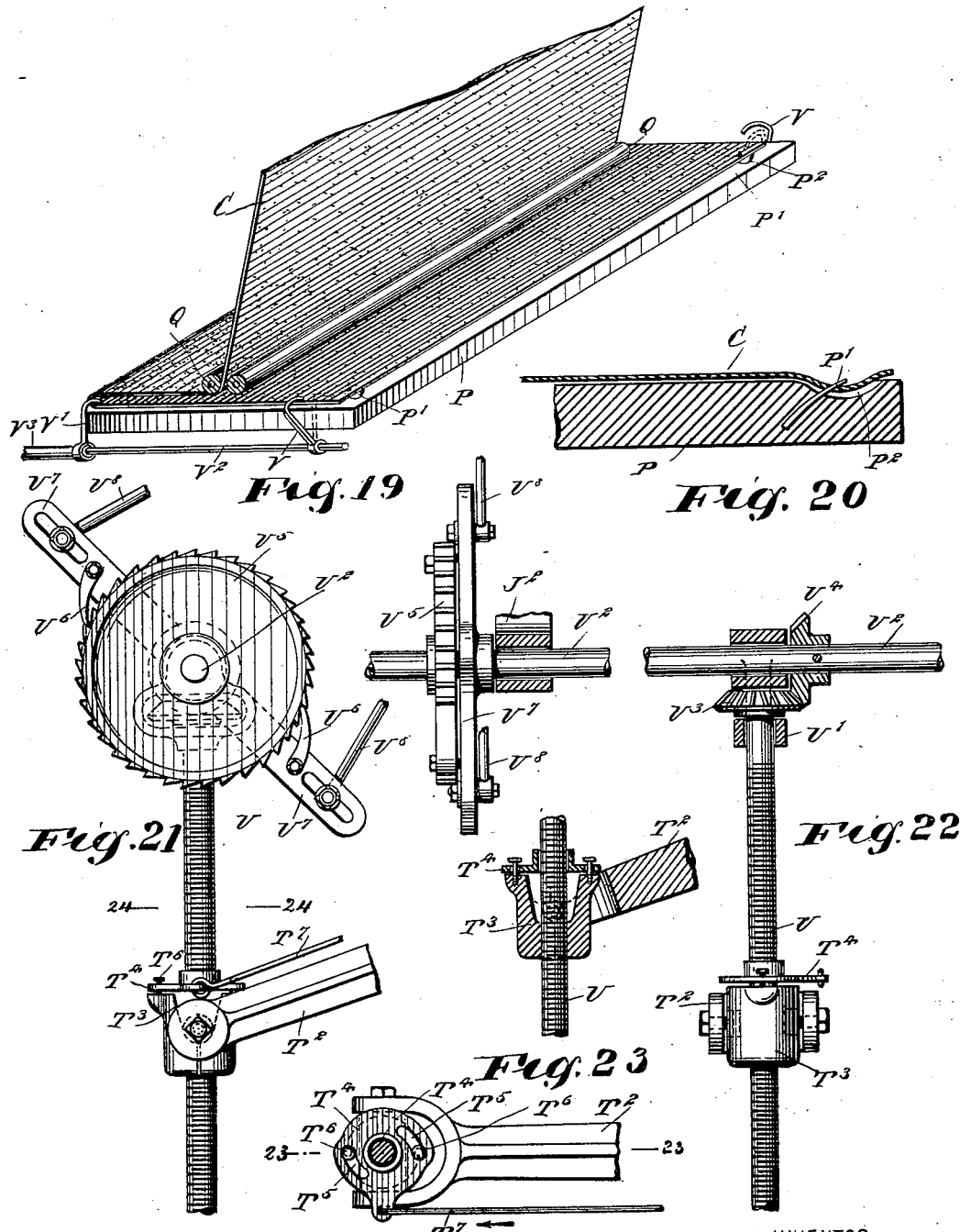

UNITED STATES PATENT OFFICE.

WILLIAM HEBDON, OF BROOKLYN, NEW YORK, ASSIGNOR TO THE HEBDON MACHINE AND CLOTH FINISHING COMPANY, OF BOROUGH OF MANHATTAN, NEW YORK, N. Y.

METHOD OF SHRINKING AND FINISHING LINENS, COTTONS, OR OTHER FABRICS.

SPECIFICATION forming part of Letters Patent No. 676,462, dated June 18, 1901.

Application filed April 26, 1899. Serial No. 714,526. (No specimens.)

*To all whom it may concern:*

Be it known that I, WILLIAM HEBDON, of the city of New York, borough of Brooklyn, in the county of Kings and State of New York, have invented a new and Improved Method of Shrinking and Finishing Linens, Cottons, Ducks, Drills, or Like Fabrics, of which the following is a full, clear, and exact description.

The object of the invention is to provide a new and improved method for shrinking and finishing cottons, linens, ducks, drills, and like textile fabrics, the entire operation requiring but very little time and insuring regular even shrinkage, perfect finishing without undue stretching, and accurate measurement without necessitating the employment of skilled labor.

The method consists in saturating a piece of cloth, then subjecting the saturated piece to pressure to squeeze out surplus moisture, then rolling the wet piece in a dry one to moisten the latter by moisture from the wet piece, then heating and drying both pieces in open width, and finally pressing the pieces in open width.

In order to carry the method into effect, I employ an apparatus such as shown in the accompanying drawings, forming a part of this specification, in which similar characters of reference indicate corresponding parts in all the views.

Figure 15:
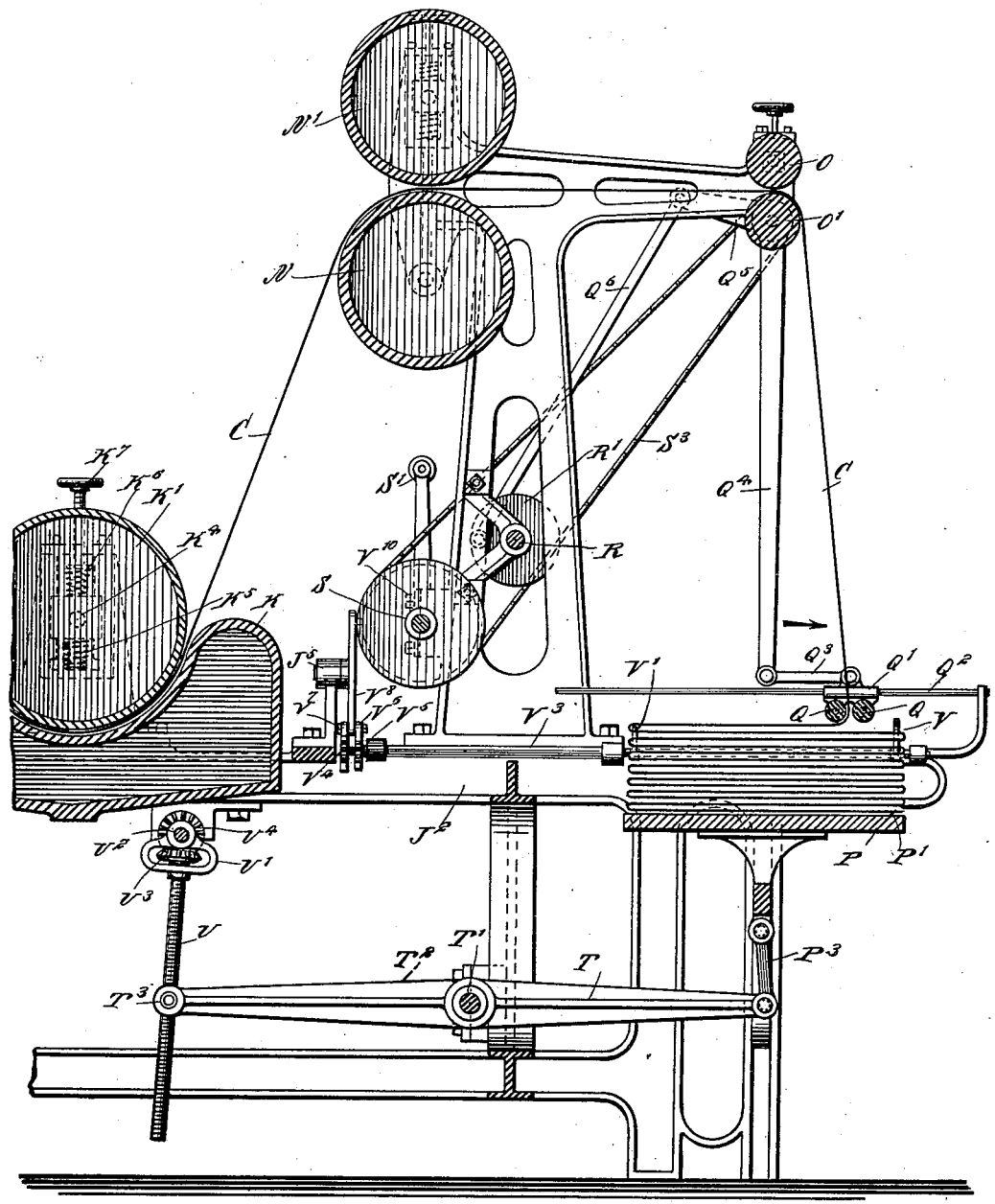

Figure 1 is a side elevation of the entire apparatus for carrying the method into effect. Fig. 2 is an enlarged side elevation, with part in section, of the saturating-tank and squeezing-rolls for the piece of cloth. Fig. 3 is an end elevation of the same. Fig. 4 is a sectional perspective view of one of the baskets for holding the piece of cloth while immersing it in the water in the saturating-tank. Fig. 5 is an enlarged side elevation of the winding-stand with parts extended. Fig. 6 is an end elevation of the same with parts folded up and ready for transportation. Fig. 7 is a sectional side elevation of the same on the line 7 7 in Fig. 6. Fig. 8 is an enlarged side elevation of part of the same on the line 8 8 in Fig. 6. Fig. 9 is a transverse section of the same on the line 9 9 in Fig. 8. Fig. 10 is an enlarged side elevation of the drying and shrinking apparatus. Fig. 11 is a cross-section of the same on the line 11 11 in Fig. 10. Fig. 12 is a sectional side elevation of part of the same on the line 12 12 in Fig. 11. Fig. 13 is an enlarged side elevation of the pressing, measuring, and folding machine. Fig. 14 is a rear end elevation of the same. Fig. 15 is an enlarged sectional side elevation of the same on the line 15 15 in Fig. 14. Fig. 16 is an enlarged end view of part of the same. Fig. 17 is a sectional plan view on the line 17 17 in Fig. 16. Fig. 18 is an enlarged sectional side elevation of another part of the same on the line 18 18 in Fig. 17. Fig. 19 is a perspective view of the folding-table and adjacent parts. Fig. 20 is an enlarged sectional side elevation of part of the folding-table. Fig. 21 is an enlarged side elevation of part of the mechanism for automatically lowering the folding-table as the folds increase thereon. Fig. 22 is a transverse section of the same. Fig. 23 is a sectional side elevation of the nut, screw, spindle, and lever for the folding mechanism, the section being on the line 23 23 in Fig. 24; and Fig. 24 is a sectional plan view of the same on the line 24 24 in Fig. 21.

In the so-called "London" process for shrinking and finishing linen, cotton, or like textile fabrics in the piece the piece was placed in a tank of water to become saturated; but owing to the tight folds of the piece it required hours for the water to penetrate it, and even then an uneven saturation took place. The unevenly-saturated piece of cloth was then removed from the tank, rolled up or again laid in folds, and left to drain; but in doing so the lower portion of the roll or fold contained much more moisture than the upper parts, and consequently an uneven draining took place. The goods after draining in the manner described were hung up in loose folds on poles to dry; but the drying process, besides being irregular, required a long time, and other methods for accomplishing the drying by heated cylinders, for instance, have proved a failure, as the goods are to a great extent unduly stretched. The pressing by the London process is mostly done by the cloth being folded up and having pressed paper between the folds, or one layer of paper between adjacent layers of the fabric to form a pile, which is placed in a suitable press and pressed either by hot or cold plates engaging the pile at the top and bottom; but as the shrinking of the fabric was uneven and irregular the pressing did not rectify the defects and the goods were not properly finished. The pressing of the goods by the rotary process and tension-rods as now practiced causes undue stretching of the fabric, and hence thus increases the defects instead of diminishing the same. With my method, presently to be described in detail, the linen, cotton, or similar fabric piece goods are uniformly shrunk and properly dried and pressed, and by the use of my improved pressing-machine the fabric is not subjected to the action of tension-rollers, as the pressing-roller rises and falls, according to the thickness of the fabric, and properly presses the thinnest fabric, as well as the heaviest felting, without the least stretching. After pressing the fabric, even that of the most delicate texture, is accurately measured, and while this takes place and the fabric passes upon a roller or is folded up it can be readily and finally examined by the operator.

Fabrics for forming garments and the like and to be treated are placed in a tank A, filled with water; but in case the fabrics are for use in the manufacture of tents and other waterproof articles then the tank is filled with a solution of water and alum, which latter serves to close the fiber of the fabric. In the liquid contained in the tank A is placed a basket B, having a suitable chain $B'$ or other means for conveniently lowering the basket into the tank or raising it out therefrom, and such tank contains a piece of cloth C in folds $C'$, as is plainly indicated in Figs. 1 and 2, so that it is thoroughly saturated by the liquid contained in the tank A, and when this is accomplished the cloth is passed upward out of the liquid and between wringer or squeezing rolls D $D'$, journaled in bearings $D^2$ $D^3$, respectively, of which the bearing $D^3$ is secured in a frame $D^4$, attached to the top of the tank A, as is plainly indicated in Figs. 1, 2, and 3. The other bearing $D^2$ is mounted to slide longitudinally in guideways on said frame and is adjusted toward and from the other bearing $D^3$ by a screw-rod $D^5$ or other suitable means to bring the roll D with more or less force in contact with the piece of cloth C to squeeze out a portion of the moisture taken up in the tank A. On the roll $D'$ is secured a crank-arm $D^6$ under the control of the operator for turning said roll $D'$ and causing the piece of cloth C to pass up between the two rolls to squeeze out a portion of the moisture and draw the piece out of the basket. The piece then passes upon a reel or spit E and is wound up thereon, together with a second piece of cloth $C^2$, arranged in folds $C^3$ in a dry state on a table F, hinged to the framework of a stand G, in which the reel E is removably journaled, as is plainly indicated in Figs. 1, 5, 6, 7, 8, and 9. Instead of passing the piece of cloth C directly over to the spit E it may be first passed over a guide-roller $D^7$, journaled on the top of the frame $D^4$. The two pieces of cloth C $C^2$ pass in opposite directions to the reel E, the piece C passing under a guide-roller $G'$ and the piece $C^2$ over a guide-roller $G^2$, both rollers being journaled in arms $G^3$, pivoted at their middle on a bolt $G^4$, held in the framework of the stand G, as is plainly indicated in Fig. 6. The guide-roller arms are thus mounted to rock to bring the rollers $G'$ $G^2$ into proper position relative to the heating apparatus, as hereinafter more fully described, the swinging motion of the arms being, however, limited by a stop-lug $G^5$, fixed on the stand and extending into an elongated notch $G^6$ in one of the arms, as shown in Figs. 8 and 9.

In elongated bearings on the sides of the stand-frame is journaled the axle $G^7$ of wheels $G^8$ for conveniently moving the stand from the tank A between two heating apparatus H $H'$, as is plainly illustrated in Fig. 1. When the stand is in position between the heating apparatus, then the wheels $G^8$ are in an uppermost positon, as indicated in Figs. 5 and 6, so that the legs of the stand rest on the floor; but when it is desired to move the stand about from one place to another then the framework of the stand is raised to lift the legs off the floor and to support the stand on the wheels $G^8$. For this purpose the following device is provided: On the framework are pivoted the bell-crank levers $G^9$, each adapted to engage with one arm the axle $G^7$ and connected at its other arm by a link $G^{10}$ with levers $G^{11}$, fulcrumed on the framework and extending transversely therein to be under the control of the operator. When the outer ends of the levers $G^{11}$ are swung upward, the links $G^{10}$ are moved downward, and a swinging motion is given to the bell-crank levers $G^9$, so that the arms resting on the axle $G^7$ cause a lifting of the stand G, as indicated in Fig. 7, to permit of conveniently moving the stand from one place to another, the wheels $G^8$ traveling on the floor. The ends of the stand are provided with suitable handles $G^{12}$, adapted to be taken hold of by the operators to move the stand from one place to another.

The reel or spit E is turned by a suitable crank-arm or other means, so as to roll up the moistened and the dry piece of cloth in such a manner that the layers of the moistened piece of cloth alternate with those of the dry piece, and consequently the moisture contained in the wet piece of cloth passes by capillary attraction into the layers of the dry piece of cloth, and consequently both pieces are uniformly moistened. When this has been done, the stand G, with the roll having the two pieces of evenly-moistened cloth C $C^2$, is positioned between the two heating apparatus H $H'$, which are alike in construction.

(See Fig. 1, also Figs. 10, 11, and 12.) The two pieces C C² are now unwound from the reel E and passed in open width in opposite directions over the heating-surfaces of the apparatus H H' to be wound up on the reels or spits I I', respectively, loosely journaled in the outer ends of the framework H² for the apparatus H H'.

Each heating apparatus H H' is provided with a casing H³, preferably made of sheet-iron, having a flat perforated top, (see Fig. 12,) over which passes the piece of cloth, without, however, touching the casing, the cloth being stretched between two guide-rollers I² I³, journaled in the ends of the framework H², the rollers being located directly under the corresponding spit or reel I or I', located at the ends of the heating apparatus H H'. (See Fig. 1.) Within each casing H³ is arranged a coil of pipe H⁴, connected at its ends with valved pipes H⁵, one of which leads to a boiler or other steam-supply and the other to a place of discharge, and from the coil also lead branch pipes H⁶ to connect with a pipe H⁷ for carrying off the water of condensation to a suitable place of discharge, said pipe H⁷ being provided with a suitable valve H⁸, which is opened from time to time for discharging the water of condensation. As the piece of cloth is wound on the spit or reel I I' the roll thus formed increases in size and the shaft of the reel slides upward in the elongated bearings for the spit to accommodate the size of the roll, the piece of cloth, however, being kept uniformly stretched at the same height over the heating-surface H³ owing to the position of the guide-rollers I² I³, of which the latter supports the roll of cloth wound on the reel. Now by the arrangement described the heated coil H⁴ causes a heating of the casing H³ and of the air passing through the perforations in said casing, so that the piece of cloth passing in open width over said casing is thoroughly heated, and thereby dried and shrunk without the least stretching, and is wound up in this condition on the corresponding reel or spit I or I'. The reels I I', with the dried and shrunken pieces of cloth thereon in roll form, are now removed from their bearings on the framework H² and transferred to bearings J' on pressing, measuring, and folding machines J (shown in Figs. 1, 13, 14, and 15) to properly press the piece of cloth without straining the texture of the fabric, then accurately measure it, and finally roll or fold it up. The pressing device is provided with dies K K', of which the die K is fixed to the framework J² and is made hollow and connected with a steam-supply pipe K² and a pipe K³ for carrying off the water of condensation, both pipes K² K³ being supplied with suitable valves. The top surface of the die K is made segmental for receiving the other die K', which is in the form of a cylinder mounted to turn in bearings K⁴, fitted to slide vertically in standards carried by the framework J², said bearings K⁴ resting on springs K⁵ and pressed on top by springs K⁶, the tension of which is regulated by screw-rods K⁷, screwing in the standards, to permit of adjusting the die K' relatively to the die K according to the nature of the fabric under treatment. Now as the piece of cloth C or C² is unrolled from the reel I or I', respectively, it is passed between the dies K K' to be pressed and heated, and thereby thoroughly fixed and finished. If desired, the heating of the die K may be omitted, so that the cloth is cold-pressed while passing between the dies, the die K' being rotated as the cloth passes between said dies. Thus it will be seen that by the arrangement described the cloth is not stretched or strained during the pressing operation, which is entirely uniform throughout the piece, and consequently cloth of a high quality is produced. The ends of the die K are rounded off, as at K⁸ K⁹, to permit the cloth to readily enter between the dies and leave the same without being strained. The cloth after leaving the dies passes upward between the cylinders N N', forming part of a measuring-machine mounted on part of the framework J², as illustrated in the drawings. The measuring-machine cylinder N' is mounted in vertically-slidable and yieldingly-supported bearings, the same as the die K', so that further description of this mounting is not deemed necessary. The measuring-machine cylinder N actuates a recording device N², of any approved construction, to properly record the length of the piece of cloth passed between the measuring-cylinders N N', it being understood that the cylinder N' is adjusted according to the thickness of the cloth passed between the cylinders, so that the cloth is not injured in any way while passing through the measuring-machine. The measured cloth then passes between two drawing-rollers O O', of which the roller O is journaled in vertically-adjustable bearings to permit of adjusting said roller relatively to the roller O' and according to the thickness of the cloth under treatment. The cloth after leaving the drawing-rollers O O' passes to the folding-machine for laying the cloth in folds of a desired length, said folding-machine being provided with a table P, arranged to be automatically lowered as the folds accumulate on the said table. The cloth between the drawing-rollers O O' and the table P extends between two rollers Q, journaled in a carrier Q', mounted to slide longitudinally on suitable guideways Q², attached to the framework J². Links Q³ connect the carrier Q' with a bell-crank lever Q⁴, fulcrumed on the shaft for the lower drawing-roller O', and the arms Q⁵ of this bell-crank lever are pivotally connected by links Q⁶ with crank-disks R', secured on a shaft R, extending transversely and journaled in suitable bearings carried by the framework J². (See Figs. 14 and 15.) The shaft R is connected by gear-wheels R² R³ with a shaft S, likewise extending transversely and journaled in suitable bearings on the framework J² and having a crank-arm S' at one end for permitting the operator to turn said shaft S to rotate the shaft R by the gear-wheels R² R³ and to cause a swinging of the bell-crank levers Q⁴ by the action of the links Q⁶, connecting the disks R' with the arms Q⁵. The swinging motion given to the bell-crank levers causes a forward and backward sliding of the carriers Q' on the guideways Q², so that the rollers Q carry the cloth forward and backward and fold it on the top of the table P.

In order to insure a proper folding of the cloth, it is necessary that the carriers Q' travel in proper proportion relatively to the drawing-rollers O' and O, and for this purpose the shaft S is provided at one end with a sprocket-wheel S², over which passes a sprocket-chain S³, also passing over a sprocket-wheel S⁴ on the shaft for the drawing-roller O'. Now when the shaft S is rotated a rotary motion is given to the roller O' in unison with the movement given to the carrier Q', so that no straining of the fabric whatever takes place while passing between the dies, the measuring-cylinders, the drawing-rollers, or while finally folded on the table P.

As the guideways Q' are fixed, it is evident that the rollers Q travel always in the same horizontal plane, and as the folds increase it is necessary that the table P be proportionately lowered for each fold. For this purpose the table P is mounted to slide in suitable guideways on the framework J² and is pivotally connected at its under side by links P³ with arms T, projecting rearwardly from a transverse shaft T', journaled in suitable bearings on the framework J². On the shaft T' is secured a forwardly-extending arm T², carrying in its forked end a nut T³, preferably made in sections and hung on centers in the fork of said arm T². In the nut screws a screw-rod U, mounted to turn loosely at its upper end in a bearing U', hung loosely on a shaft U², extending transversely and journaled in suitable bearings attached to the framework J², as is plainly indicated in Fig. 15.

On the upper end of the screw-rod U is secured a bevel gear-wheel U³, in mesh with a bevel gear-wheel U⁴ on the shaft U², which latter is provided near one end with a ratchet-wheel U⁵, engaged at opposite sides by pawls U⁶, fulcrumed on a rocking arm U⁷, mounted to swing loosely on the shaft U² as a center. The outer ends of the rocking arm U⁷ are pivotally connected with two eccentric-rods U⁸ of eccentrics U⁹ on the shaft S and having their disks standing diametrically opposite each other, so that a forward and backward rocking motion is given to the arm U⁷ when the shaft S is rotated, as above explained. When the arm U⁷ is rocked, as described, a continuous rotary motion is given to the ratchet-wheel U⁵ by the pawls U⁶, so that the shaft U² is turned, and the rotary motion of the latter is transmitted by the gear-wheels U⁴ U³ to the screw-rod U, which causes the nut T³ to travel in an upward direction to impart an upward swinging motion to the arm T² and a downward swinging motion to the arms T, so that the links P³ cause the table P to slide in an upward direction as the folds accumulate on said table. It is understood that the several parts described are so proportioned that the rotary motion of the shaft T, which controls the movement of the fabric C and the laying of the folds, also causes a downward sliding of the table P in proportion to the accumulation of folds on said table P.

In order to properly lay the cloth in folds of a desired length, sets of fingers V V' are provided, of which the fingers V are adapted to engage the side edges of the cloth near the outer end of the table P, while the fingers V' are adapted to engage the side edges of the cloth near the inner end of the table. (See Figs. 15, 16, 17, 18, and 19.) The sets of fingers V V' are adapted to alternately engage and disengage the cloth in the manner described—that is, the fingers V engage the cloth at the time the rollers Q in the carrier Q' are traveling rearwardly and the fingers V' engage the cloth immediately previous to the return or outward movement of the rollers Q to allow a proper fold to be formed, this end of the cloth being held until the rollers are again on the return movement at the time the cloth is engaged by the other fingers V. The fingers V are secured on longitudinally-extending shafts V², extending loosely through and mounted to turn in the hollow shafts V³, carrying the other fingers V'. On the shafts V² V³ are secured gear-wheels V⁴ V⁵, respectively, in mesh with racks V⁶ V⁷, respectively, mounted to slide transversely in suitable bearings J⁴, attached to the framework J². Each of the racks V⁶ V⁷ is so formed that one end engages the corresponding gear-wheel V⁴ or V⁵ at the bottom and the other corresponding gear-wheel at the top, and when a lateral sliding motion is given to one of the racks then the two corresponding gear-wheels are simultaneously moved to turn the shafts and move the set of fingers inwardly or outwardly, according to the direction in which the rack is shifted.

In order to impart the desired sliding motion to the racks V⁶ V⁷, they are pivotally connected at or near their middle with levers V⁸ V⁹, fulcrumed on a bracket J⁵, attached to the framework J². The levers V⁸ V⁹ have pins or friction-rollers projecting into grooves on the peripheries of cam-wheels V¹⁰ and V¹¹, secured on the shaft S, so that when the latter is rotated said cam-wheels impart the desired sliding motion to the racks V⁶ and V⁷ by the action of the levers V⁸ V⁹, receiving their swinging motion from said cam-wheels.

When the machine is in operation, the sets of fingers V V' automatically change positions whenever the rollers Q on the carriers Q' are near the ends of their strokes to insure a proper laying of the cloth in folds on the table, as before explained. When a piece of cloth is finished and folded on the table, it is finally removed therefrom and is ready for the market.

In order to quickly raise the table P to its original position for receiving the next piece of cloth, the following arrangement is provided: The split nut $T^3$ is engaged on top by a cover $T^4$, having angular slots $T^5$, engaging pins $T^6$ on the sections of the nut, and this cover is mounted to turn loosely on the screw-rod U and is pivotally connected by a shifting rod $T^7$ with the rear end of the machine, as is plainly shown in Fig. 13, so as to be within convenient reach of the operator. When it is desired to raise the table, the operator pushes the rod $T^7$ forward to cause a turning of the cover $T^4$ and an opening of the sections of the nut $T^3$ to disengage the threads of the nut from the threads of the screw-rod, so that the operator can readily lift the table to its previous position, the lever formed by the arms T $T^2$ and the shaft T', together with the link $P^3$, following the movement of the table. It is understood that the nut $T^3$ now passes back to a lowermost position on the rod U, and then the operator exerts a pull on the rod $T^7$ to again close the sections of the nut on the screw-rod, so that when the latter is rotated the nut travels upward on the screw-rod to lower the table, as previously explained.

From the foregoing it is evident that the cloth by the treatment described receives a thorough uniform moistening, shrinking, and drying, and a final finishing by being pressed between dies, so that the cloth leaves the machine in a perfect condition and without danger of being unduly stretched. Furthermore, the cloth is accurately measured and then nicely folded, so as to be immediately ready for being cut into parts for making garments, tents, and other articles. If desired, the cloth may be rolled up instead of being folded.

By subjecting the piece of cloth to a uniform pressure throughout its length and width after it has the fiber set, as above described, a permanent finish is given to the cloth and not an artificial and deceptive one, as heretofore practiced, and such permanent finish is not liable to spot from rain and prevents shrinkage of the fabric.

Any imperfections in the cloth caused by previous treatments in the mill or otherwise and ordinarily hidden by the artificial finish produced by hot-pressing or other cause are readily discovered through my improved process, as such artificial finish is removed by the fiber-setting process, and consequently when the cloth leaves the measuring-machine and is then examined permits the examiner to at once detect such imperfections.

My even method of drying is a sure preventive of mildew on account of the uniform moistening and drying of the goods, and which mildew was due to the uneven wetting and drying in the old process heretofore practiced.

Having thus fully described my invention, I claim as new and desire to secure by Letters Patent—

1. The herein-described method of shrinking and finishing cloth, consisting in saturating a piece of cloth, then subjecting the saturated piece to pressure to squeeze out surplus moisture, then rolling the wet piece in a dry one to moisten the latter by moisture from the wet piece, then heating and drying both pieces in open width, and finally pressing the pieces in open width, as set forth.

2. The herein-described method of shrinking and finishing two pieces of cloth simultaneously, consisting in moistening one sheet and rolling it up in a dry piece to transfer part of the moisture to the dry piece, then separating the pieces and heating the same over separate heating-surfaces, and finally pressing the pieces in open width, as set forth.

3. The herein-described method of shrinking and finishing cloth, consisting in moistening one sheet of cloth and rolling it up in a dry sheet of cloth to moisten the latter by moisture from the wet sheet, then unrolling the moistened sheets and passing the same separately in different directions without stretching and under application of heat to dry the sheets, and then subjecting each sheet to pressure, to fix and finish the cloth, as set forth.

4. The herein-described method of shrinking and finishing cloth, consisting in moistening one sheet of cloth and rolling it up in a dry sheet of cloth to moisten the latter by moisture from the wet sheet, then unrolling the moistened sheets and passing the same separately in different directions without stretching and under application of heat to dry the sheets, then subjecting each sheet to pressure, to fix and finish the cloth, and finally measuring the finished cloth, as set forth.

WILLIAM HEBDON.

Witnesses:
THEO. G. HOSTER,
EVERARD BOLTON MARSHALL.